United States Patent [19]

Edwards et al.

[11] Patent Number: 4,969,228
[45] Date of Patent: Nov. 13, 1990

[54] VEHICLE WIPER PARK RAMP ASSEMBLY

[75] Inventors: Ralph W. Edwards, Rochester;
Thomas E. Gardziola, Fraser, both of Mich.

[73] Assignee: General Motors Corporation, Detroit, Mich.

[21] Appl. No.: 371,133

[22] Filed: Jun. 26, 1989

[51] Int. Cl.$^5$ .............................................. B60S 1/04
[52] U.S. Cl. ................................................ 15/250.19
[58] Field of Search ............ 15/250.16, 250.17, 250.19

[56] References Cited

U.S. PATENT DOCUMENTS

| | | | |
|---|---|---|---|
| 2,284,844 | 6/1942 | Rappl | 15/255 |
| 3,019,468 | 2/1962 | Hatch | 15/250.19 |
| 3,110,920 | 11/1963 | Dangler | 15/250.16 |
| 4,040,141 | 8/1977 | O'Steen | 15/250.19 |
| 4,310,943 | 1/1982 | Palma | 15/250.19 |
| 4,345,352 | 8/1982 | Terabayashi | 15/250.16 |
| 4,765,019 | 8/1988 | Ochino | 15/250.19 |

FOREIGN PATENT DOCUMENTS

| | | | |
|---|---|---|---|
| 63532 | 4/1983 | Japan | 15/250.19 |
| 63551 | 4/1983 | Japan | 15/250.19 |
| 100035 | 6/1984 | Japan | 15/250.19 |
| 60354 | 3/1986 | Japan | 15/250.19 |

OTHER PUBLICATIONS

1988 Oldsmobile Delta 88—Ninety-Eight Chassis Service Manual Drawing "1986 Change".

*Primary Examiner*—Philip R. Coe
*Assistant Examiner*—Joseph S. Machuga
*Attorney, Agent, or Firm*—Patrick M. Griffin

[57] ABSTRACT

A wiper park ramp has two components, a softer isolation pad to cushion the initial and final arm impacts, and a harder skid pad to reduce sliding friction.

2 Claims, 2 Drawing Sheets

VEHICLE WIPER PARK RAMP ASSEMBLY

This invention relates to vehicle wipers in general, and specifically to a park ramp assembly for lifting the wiper blade at the park position of the wiper.

BACKGROUND OF THE INVENTION

Vehicle wipers include a wiper arm and flexible wiper blade that is oscillated over a normal wiper pattern, between an inwipe and outwipe position. Often, the drive mechanism for the wiper provides for a lowered park position for the wiper, below the normal inwipe position. Generally, the wiper blade is moved completely off of the plane of the windshield, and over a panel peripheral to the edge of the windshield. The wiper parks automatically when the wiper is deactivated. It is desirable to lift the wiper blade away from the windshield in the park position, so as to avoid giving the soft blade a permanent set. This is generally done by a park ramp that hits the arm when the wiper moves into the park position, lifting it and relieving the pressure on the blade. Known park ramps are typically formed from one material. Those made from harder materials, such as hard plastics, lift the arm consistently when they engage, but the impact is hard and noisy. Those made from softer, more resilient materials, such as elastomers, are quiet, but do not lift the arm as consistently, because the arm tends to stick as it hits.

SUMMARY OF THE INVENTION

The invention provides a park ramp assembly with both consistent lift and quiet operation. The assembly includes two components, an isolation pad of a softer, more resilient material, with a tackier surface, and a skid ramp formed of a harder material, with a more slippery surface. The isolation pad has two portions, a support portion adapted to be secured to the vehicle body at a shallower angle relative to the plane of the windshield, and a flat surfaced stop portion secured to the vehicle body at a steeper angle. The skid ramp is secured to the vehicle body, above the support portion of the isolation pad, and in contact with it. The surface of the skid pad terminates just short of the flat surface of the isolation pad stop portion, forming a shallow, V shaped notch. In addition, in the embodiment disclosed, the support portion of the isolation pad has a tubular sleeve that fits loosely through a hole in a cowl panel below the windshield. The skid pad has a finned stem portion that fits tightly through the sleeve, expanding it out to grab the cowl panel, cooperatively securing both components and trapping the support portion between the cowl panel and the skid pad. When the wiper arm moves to park, it initially hits the hard skid pad, the impact of which is cushioned by the softer isolation pad. The arm finally hits the isolation pad stop portion, the impact of which is also cushioned, and catches in the shallow retention notch.

It is, therefore, a general object of the invention to provide a wiper park ramp assembly that gives both consistent lift, and quiet operation.

It is another object of the invention to provide such a park ramp assembly through the use of a lower isolation pad formed of a softer, more resilient material that supports an upper skid ramp formed of a harder, more slippery material, so as to cushion the initial impact of the wiper arm.

It is another object of the invention to provide such a park ramp in which the isolation pad also has a flat surfaced stop portion secured to the vehicle at a steeper angle, so as to cushion the final impact of the arm, as well.

It is another object of the invention to provide the isolation pad support portion with a tubular attachment sleeve through which a stem of the skid ramp is pushed to cooperatively retain both members to a hole in a body panel peripheral to the windshield.

DESCRIPTION OF THE PREFERRED EMBODIMENT

These and other objects and features of the invention will appear from the following written description, and from the drawings, in which.

Figure 1:
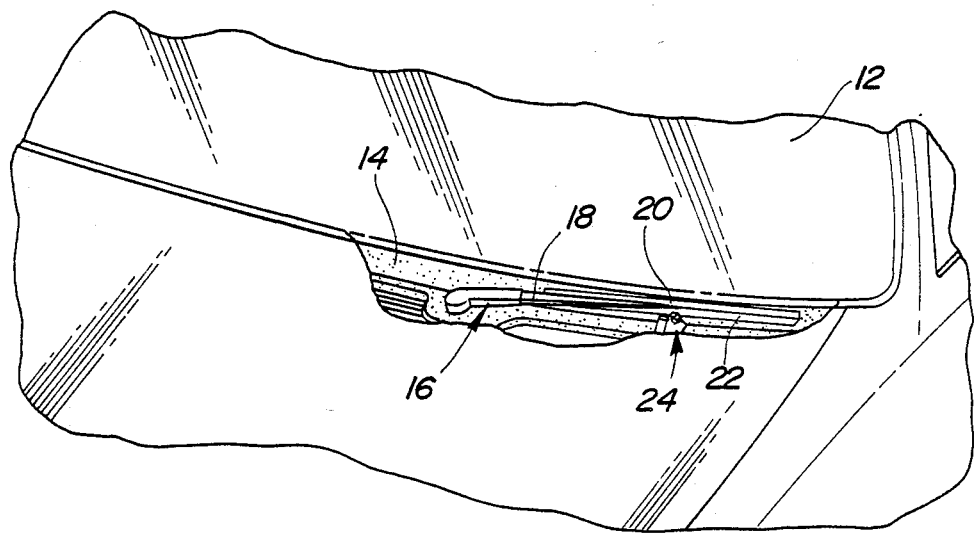
FIG. 1 is a perspective view of a portion of the front of a vehicle body and windshield, showing a wiper in the park position.
Figure 3:
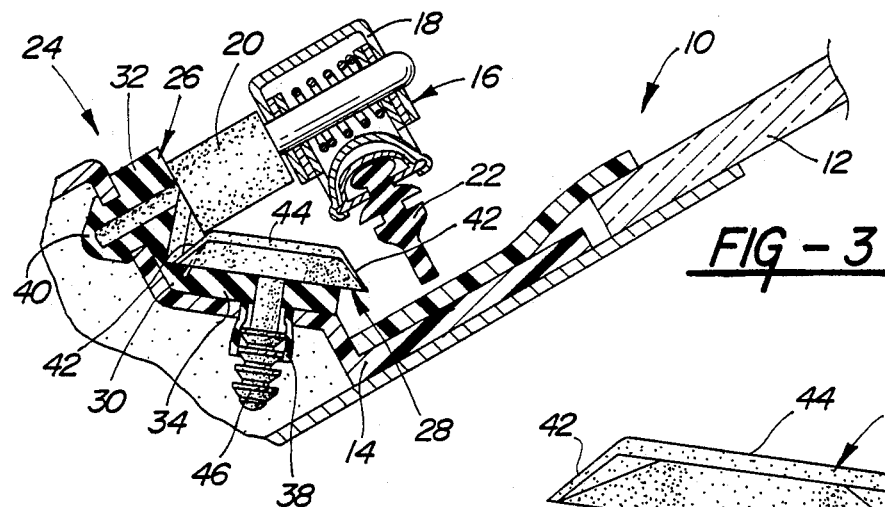
FIG. 3 is a cross sectional view of the invention and the wiper, showing the wiper in park position.

Referring first to FIGS. 1 and 3, a vehicle body indicated generally at 10 includes a front, generally planar windshield 12, the lower edge of which is supported by a cowl panel 14. Cowl panel 14 is locally formed into a shallow V shape, for a purpose described below. Rotatably mounted to cowl panel 14 is a wiper 16, which is oscillated between an outwipe and inwipe position in conventional fashion. Wiper 16 is shown at the lowermost park position, below inwipe and overlaying cowl panel 14. As best seen in FIG. 3, wiper 16 has a wiper arm 18 with a hard molded plastic tip 20 of rectangular cross section, to which a flexible wiper blade 22 is side mounted. Arm tip 20 therefore leads blade 22 as arm 18 is moving toward inwipe or park position. A preferred embodiment of the park ramp assembly of the invention, indicated generally at 24, maintains the wiper blade 22 lifted above cowl panel 14 at park position. Details of park ramp assembly 24 are described next.

Figure 2:
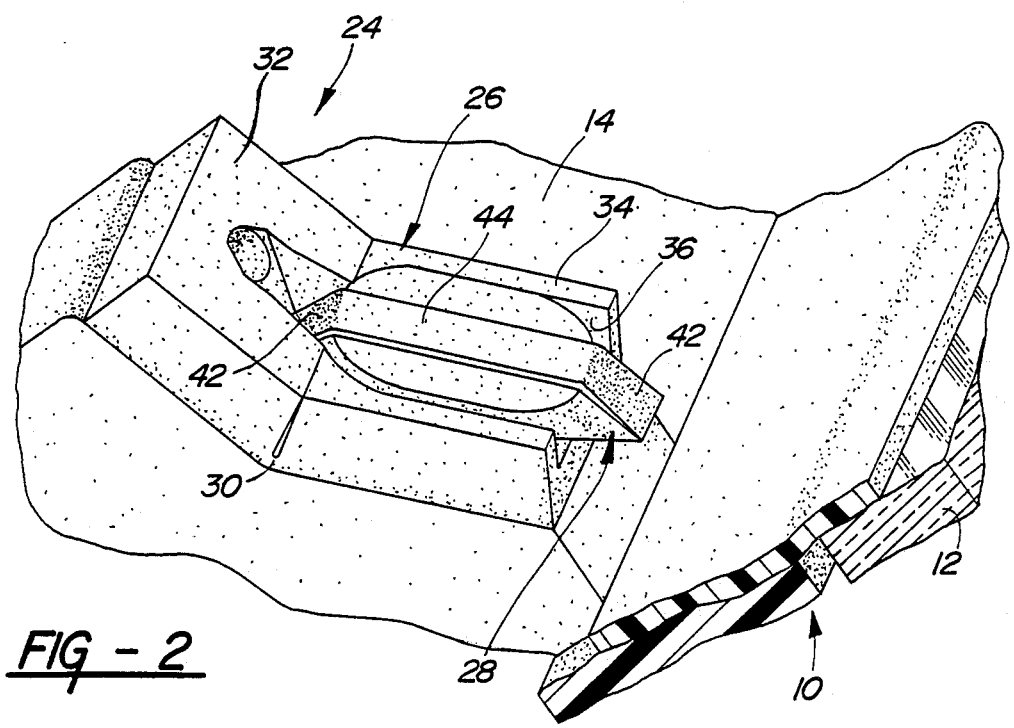
FIG. 2 is a perspective view of a preferred embodiment of the park ramp assembly of the invention.
Figure 4:
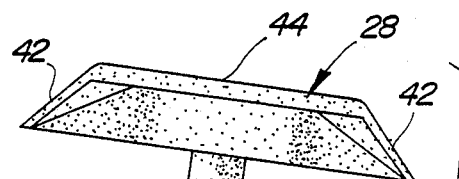
FIG. 4 is a cross sectional view of the isolation pad and skid ramp after the isolation pad is installed, but before installation of the skid ramp.
Figure 4:
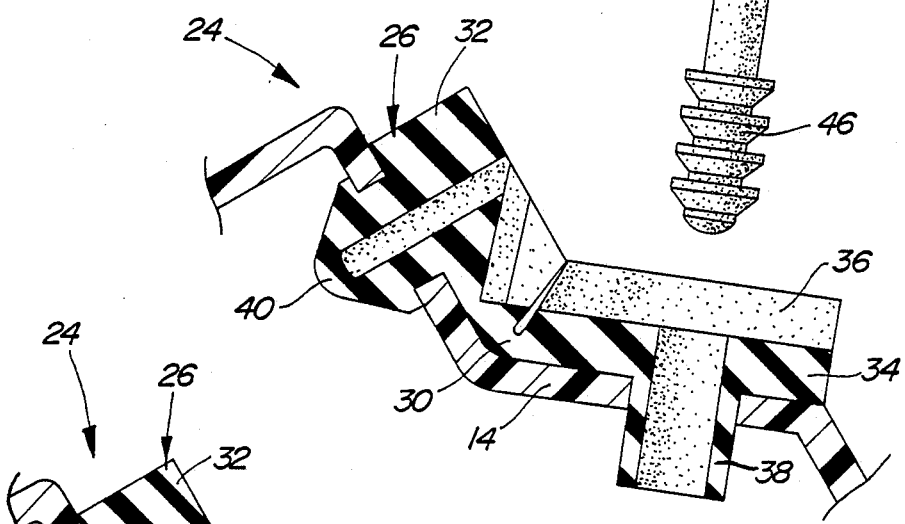

Referring next to FIGS. 2 and 4, park ramp assembly 24 includes two basic components, a lower isolation pad 26, and an upper skid ramp 28. Isolation pad 26 is molded in one piece of a soft, resilient elastomer, which also presents a tacky external surface. Pad 26 is separated into two portions at a live hinge 30, a flat surfaced stop portion 32 and a support portion 34 that has a central trough 36 molded into it. Extending down through trough 36 is a cylindrical sleeve 38, and molded to the bottom of stop portion 32 is a conical lug 40. Skid ramp 28 is molded in a one piece symmetrical shape of a hard plastic material, sized to fit closely into trough 36. A raised central rib comprised of two steeply sloped lead ins 42 and a flat bridge 44 comprise the uppermost surface of ramp 28. A central stem 46 is finned so as to be slightly larger in diameter than the inner surface of sleeve 38.

Figure 5:
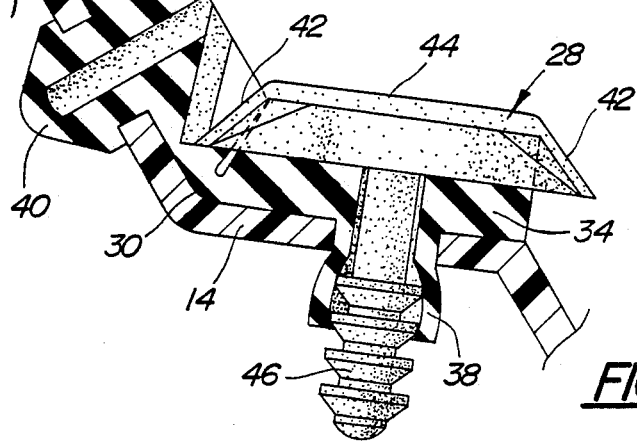
FIG. 5 is a view like FIG. 4, after the installation of the skid ramp.

Referring next to FIGS. 4 and 5, the first step in installing park ramp assembly 24 is to install isolation pad 26 by pop fitting lug 40 into one hole in cowl panel 14, and then inserting sleeve 38 into another hole. The two parts of pad 26 bend about the hinge 30, and conform to the surface of cowl panel 14. Sleeve 38 makes a loose fit, and will not retain pad 26 by itself. So installing pad 26 puts it in a location below the park location of arm tip 20, and disposes the support portion 34 at a shallow angle relative to the plane of windshield 12, of approximately 30 degrees, and the stop portion 32 at a steeper angle of nearly 90 degrees. Next, the stem 46 of skid pad 28 is pushed tightly into sleeve 38 until it is fully seated in trough 36. Stem 46 expands the softer, tackier material of sleeve 38 out the edge of the hole through cowl panel 14 to trap the isolation pad support portion 34 securely between the underside of skid ramp 28 and the cowl panel 14. When fully seated, the bridge 44 is disposed at the same shallow angle relative to the plane of windshield 12, and is raised above the upper surface of isolation pad support portion 34. Bridge 44 also ends just short of the flat surface of isolation pad stop portion 32, and so forms a shallow retention notch therewith, as best seen in FIG. 5.

Referring next to FIG. 3, as wiper 16 is deactivated and arm 18 moves to the park position, the front lower edge of wiper arm tip 20 first hits the skid ramp lead in 42, which it slides up on easily. The initial impact is absorbed by the underlying isolation pad support portion 34, and the sound created is slight. As wiper arm 18 continues to move to park position, the same edge of tip 20 slides across bridge 44, with low friction. Since bridge 44 is raised, it is assured that arm tip 20 will engage it alone, even if misaligned somewhat, rather than any part of the underlying isolation pad support portion 34, which could create drag. Arm tip 20 continues to slide across bridge 44 until its leading front flat surface hits the flat surface of isolation pad stop portion 32, which stops it, both because of its steep angle and the tackiness of its surface. The final impact of arm 18 is therefore cushioned, as well. The front lower edge of tip 20 rests in the retention notch, which it can easily exit when the wiper 16 is reactivated, by virtue of the slippery surface of bridge 44.

Variations of the preferred embodiment may be made. Skid ramp 28 could be independently attached to cowl panel 14, so long as some part of isolation pad 26 were trapped beneath it to provide cushioning. The upper surface of skid ramp 28 need not be raised, but bridge 44 helps to assure an easy sliding motion, and creates the shallow retention notch with the isolation pad stop portion 32. Therefore, it will be understood that it is not intended to limit the invention to just the preferred embodiment disclosed.

The embodiments of the invention in which an exclusive property or privilege is claimed are defined as follows:

1. In a vehicle body having a generally planar windshield and a wiper with a windshield wiping blade mounted to the side of a blade supporting arm that swings into a park position below the normal inwipe position of said wiper when said wiper is deactivated, a park ramp assembly for retaining said wiper blade in an elevated position when said wiper arm is in said park position, said park ramp assembly comprising,
    an isolation pad formed of a soft, resilient plastic material, said isolation pad having a support portion adapted to be secured to said vehicle body at a shallow angle relative to the plane of said windshield and beneath the part position of said wiper arm, said isolation pad also including a generally flat stop portion adapted to be secured to said vehicle body at a steep angle relative the plane of said windshield, and,
    a skid ramp formed of a hard plastic material adapted to be secured to said vehicle body above and in contact with said isolation pad support portion at a similar angle relative to the plane of said windshield, said skid ramp also having a central rip comprised of a flat upper surface and two steeply sloped lead ins, one of which comprises the forwardmost surface of said skid ramp and the other of which maintains said flat upper surface just short of said isolation pad flat stop portion so as to form a shallow retention notch in cooperation therewith,
    whereby, when said wiper is deactivated and said wiper arm moves to said park position, it will engage said forwardmost skid ramp lead in initially with an impact cushioned by said isolation pad support portion, sliding easily along said skid ramp flat upper surface to elevate said wiper blade until catching in said retention notch as it contacts said isolation pad stop portion, the impact of which is also cushioned thereby.

2. In a vehicle body having a generally planar windshield and a body panel peripheral to said windshield, said vehicle body also having wiper with a windshield wiping blade and a blade supporting arm that swings into a park position below the normal inwipe position of said wiper and overlaying said peripheral body panel when said wiper is deactivated, a park ramp assembly for retaining said wiper blade in an elevated position when said wiper arm is in said park position, said park ramp assembly comprising,
    an isolation pad formed of a soft, resilient, and tacky plastic material, said isolation pad having a support portion including a hollow tubular attachment member adapted to fit through said body panel so as to locate said support portion at a shallow angle relative to the plane of said windshield and beneath the park position of said wiper arm, said isolation pad also including a stop portion adapted to be secured to said vehicle body at a steep angle relative to the plane of said windshield, and,
    a skid ramp formed of a hard plastic material and having an attachment step adapted to be pushed tightly through said isolation pad attachment member, thereby expanding the soft tacky material thereof into said body panel to trap said isolation pad support portion securely between said skid ramp and said body panel with said skid ramp located at a similar angle relative to the plane of said windshield,
    whereby, when said wiper is deactivated and said wiper arm moves to said park position, it will engage said skid ramp initially with an impact cushioned by said isolation pad support portion, sliding easily along said skid ramp to elevate said wiper blade until contacting said isolation pad stop portion, the impact of which is also cushioned thereby.

* * * * *